(12) United States Patent
Nishimori et al.

(10) Patent No.: US 11,463,028 B2
(45) Date of Patent: Oct. 4, 2022

(54) CONTROL DEVICE AND CONTROL METHOD FOR ACTUATOR

(71) Applicant: Mitsubishi Electric Corporation, Tokyo (JP)

(72) Inventors: Yuya Nishimori, Tokyo (JP); Satoshi Kawamura, Tokyo (JP); Naoki Imamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 297 days.

(21) Appl. No.: 16/626,678

(22) PCT Filed: Aug. 31, 2017

(86) PCT No.: PCT/JP2017/031408
§ 371 (c)(1),
(2) Date: Dec. 26, 2019

(87) PCT Pub. No.: WO2019/043883
PCT Pub. Date: Mar. 7, 2019

(65) Prior Publication Data
US 2020/0161995 A1    May 21, 2020

(51) Int. Cl.
*H02P 6/16* (2016.01)
*H02P 6/28* (2016.01)
*H02P 6/30* (2016.01)

(52) U.S. Cl.
CPC .................. *H02P 6/16* (2013.01); *H02P 6/28* (2016.02); *H02P 6/30* (2016.02)

(58) Field of Classification Search
CPC .... H02P 23/18; H02P 6/08; H02P 6/30; H02P 6/28; H02P 6/16

USPC ..................................................... 318/400.04
See application file for complete search history.

(56) References Cited

U.S. PATENT DOCUMENTS

| 6,465,975 B1 | 10/2002 | Naidu |
| 2004/0085041 A1 | 5/2004 | Prudham |
| 2006/0125439 A1* | 6/2006 | Ajima ..................... B60L 50/16 318/716 |

(Continued)

FOREIGN PATENT DOCUMENTS

| DE | 102006003151 A1 | 4/2007 |
| DE | 102006047214 A1 | 5/2007 |

(Continued)

OTHER PUBLICATIONS

German Office Action, dated Jun. 18, 2020, for German Application No. 112017007795.8, with an English translation.

*Primary Examiner* — Kawing Chan
*Assistant Examiner* — Gabriel Agared
(74) *Attorney, Agent, or Firm* — Birch, Stewart, Kolasch & Birch, LLP

(57) ABSTRACT

A sensor (110) detects the angle of the output shaft (101a) of a synchronous motor (101). A multiple rotation processing unit (301) converts the angle of one rotation or more that is detected by the sensor (110) into a multiple rotation angle. A phase difference FB unit (305) performs feedback control in such a way that the phase difference between the electrical angle and the mechanical angle of the synchronous motor (101) is a target phase difference (306). A position FB unit (302) performs feedback control in such a way that the multiple rotation angle after conversion by the multiple rotation processing unit (301) is a target position (303).

9 Claims, 6 Drawing Sheets

(56) References Cited

U.S. PATENT DOCUMENTS

| | | | |
|---|---|---|---|
| 2008/0201041 A1* | 8/2008 | Jiang | H02P 21/04 |
| | | | 701/42 |
| 2010/0264862 A1* | 10/2010 | Kitagawa | H02P 6/15 |
| | | | 318/400.13 |
| 2011/0025312 A1* | 2/2011 | Nagano | G01D 5/2497 |
| | | | 324/207.25 |

FOREIGN PATENT DOCUMENTS

| | | |
|---|---|---|
| JP | 2004-515187 A | 5/2004 |
| WO | WO 02/29959 A1 | 4/2002 |

* cited by examiner

CONTROL DEVICE AND CONTROL METHOD FOR ACTUATOR

TECHNICAL FIELD

The present disclosure relates to a control device and a control method for an actuator that is driven by a synchronous motor.

BACKGROUND ART

An actuator according to Patent Literature 1 includes a synchronous motor, a decelerating mechanism, a sensor that detects the angular position of the output shaft of the decelerating mechanism, and an electronic circuit that performs control of energization of the synchronous motor in accordance with the angular position of the output shaft of the decelerating mechanism.

CITATION LIST

Patent Literature

Patent Literature 1: JP 2004-515187 A

SUMMARY OF INVENTION

Technical Problem

An output signal of the sensor that detects the angular position of the output shaft of the decelerating mechanism has accuracy and resolution worse than those of an output signal of a sensor that detects the magnetic pole position of the rotor of the synchronous motor. When averaging or filtering of the output signal is performed in order to improve the accuracy, a lag occurs in the output signal. Further, in a case in which the distance between the sensor mounted at the output shaft of the decelerating mechanism and the electronic circuit is long, noise invades through a harness connecting both the sensor and the electronic circuit. As mentioned above, there are many causes of the degradation in the output signal of the sensor that detects the angular position of the output shaft of the decelerating mechanism. A problem is that when control of energization of the synchronous motor is performed using the output signal that has degraded, the operation of the synchronous motor is not stabilized.

The present disclosure is made in order to solve the above-mentioned problem, and it is therefore an object of the present disclosure to provide a technique for stabilizing the operation of a synchronous motor by using a sensor that detects the angle of the output shaft of an actuator.

Solution to Problem

A control device according to the present disclosure for an actuator includes: a sensor to detect the angle of the output shaft of the actuator; and processing circuitry to convert the angle of one rotation or more that is detected by the sensor into a multiple rotation angle; to perform feedback control in such a way that the phase difference between the electrical angle and the mechanical angle of a synchronous motor is a target phase difference; to perform feedback control in such a way that the multiple rotation angle after conversion is a target position of the actuator; and to control energization of the synchronous motor on the basis of both a result of the feedback control of the phase difference and a result of the feedback control of the multiple rotation angle after conversion.

Advantageous Effects of Invention

According to the present disclosure, because the phase difference feedback unit controls the speed and the position feedback unit controls the position, the operation of the synchronous motor can be stabilized using the sensor that detects the angle of the output shaft of the actuator.

DESCRIPTION OF EMBODIMENTS

Hereafter, in order to explain the present disclosure in greater detail, embodiments of the present disclosure will be described with reference to the accompanying drawings.

Embodiment 1

Figure 1:
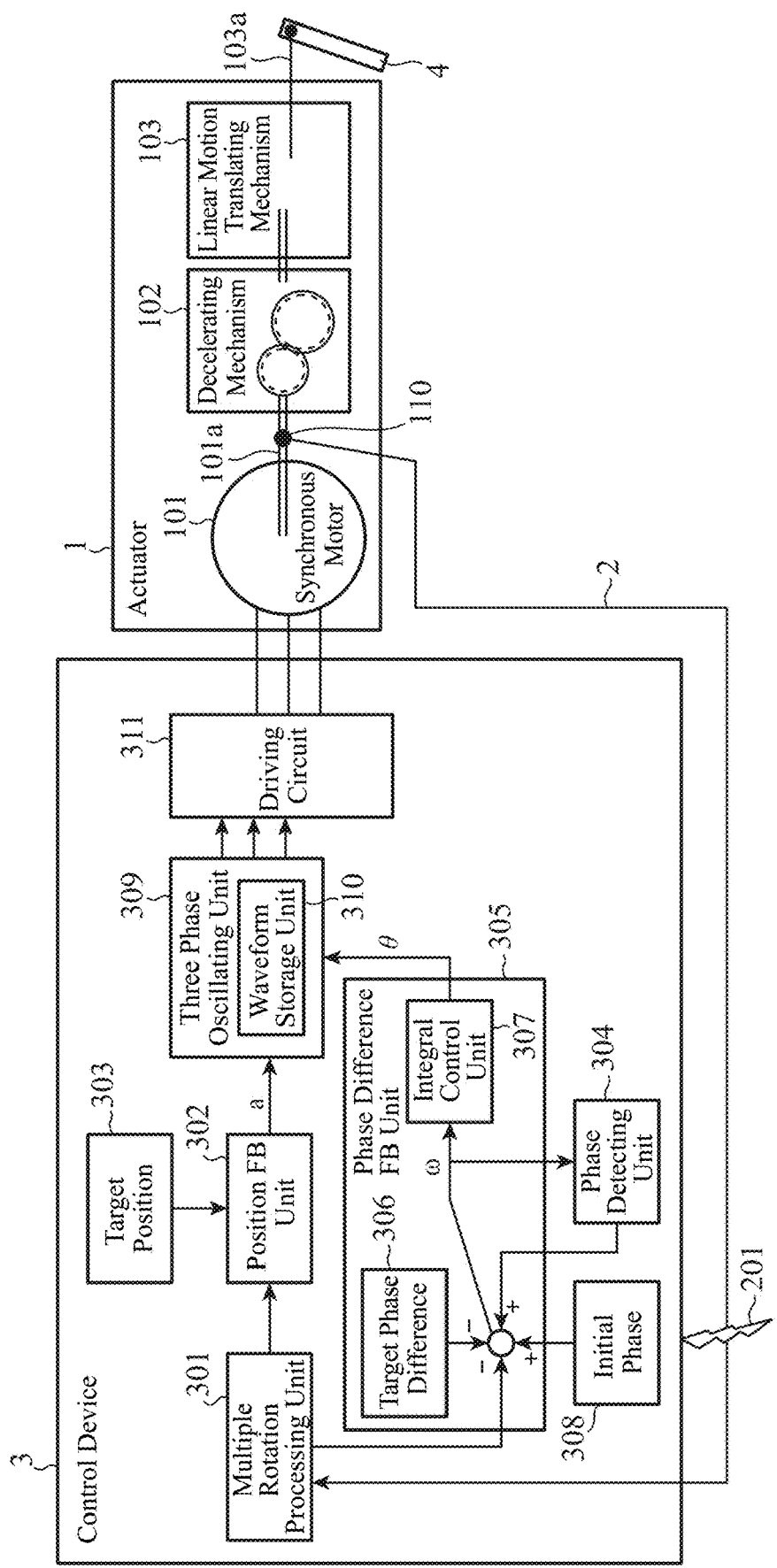
FIG. 1 is a block diagram showing an example of the configuration of a control device according to Embodiment 1 for an actuator.

FIG. 1 is a block diagram showing an example of the configuration of a control device 3 according to Embodiment 1 for an actuator 1. The actuator 1 includes a synchronous motor 101 that is a power source, a decelerating mechanism 102 that increases the torque outputted by the synchronous motor 101, a linear motion translating mechanism 103 that translates rotary motion of the output shaft of the decelerating mechanism 102 into linear motion, and a sensor 110 that detects the angle of the output shaft 101a of the synchronous motor 101. This actuator 1 causes a lever 4 or the like joined to the output shaft 103a of the linear motion translating mechanism 103 to operate. For example, the actuator 1 for vehicles opens and closes a not-illustrated exhaust gas recirculation (EGR) or waste gate valve, or the like joined to the lever 4 by causing the lever 4 to operate.

An output signal of the sensor 110 is inputted to the control device 3 via a sensor harness 2. The longer the sensor harness 2, the more easily noise 201 invades into the sensor harness 2 and the output signal of the sensor 110 degrades.

Using the output signal of the sensor 110 inputted via the sensor harness 2, the control device 3 controls energization of the synchronous motor 101, to cause the actuator 1 to operate. This control device 3 includes a multiple rotation processing unit 301, a position feedback (FB) unit 302, a phase detecting unit 304, a phase difference FB unit 305, a three phase oscillating unit 309, and a driving circuit 311. As methods of controlling the energization of the synchronous motor 101, there are a method of using a voltage vector and a method of using a current vector, and the method of using a voltage vector will be explained in Embodiment 1. The method of using a current vector will be explained in detail in Embodiment 2.

The multiple rotation processing unit 301 calculates the rotating speed and the rotation angle of the output shaft 101a of the synchronous motor 101 by using the output signal of the sensor 110.

For example, the output signal of the sensor 110 varies linearly from 0.5V to 4.5V, and thereby expresses a value ranging from 0 degrees to 360 degrees. The multiple rotation processing unit 301 samples the voltage value of the output signal of the sensor 110, for example, every 5 milliseconds, and converts the sampled voltage value into a single rotation angle ranging from 0 degrees to 360 degrees.

The output shaft 101a of the synchronous motor 101 can make one rotation or more. Thus, when the single rotation angle after conversion changes suddenly from 270 degrees or more to 90 degrees or less, the multiple rotation processing unit 301 determines that the output shaft has made one rotation by passing the position of 0 degrees in a direction (positive direction) in which the angle increases, and the multiple rotation processing unit 301 adds 360 degrees to the single rotation angle, to determine a multiple rotation angle. When the single rotation angle after conversion changes suddenly from 90 degrees or less to 270 degrees or more, the multiple rotation processing unit 301 determines that the output shaft has made one rotation by passing the position of 0 degrees in a direction (negative direction) in which the angle decreases, and the multiple rotation processing unit 301 subtracts 360 degrees from the single rotation angle, to determine a multiple rotation angle.

Hereafter, 360 degrees and −360 degrees for multiple rotation correction are referred to as multiple rotation correction values.

Next, the multiple rotation processing unit 301 limits the multiple rotation angle to a range from −1,440 degrees to 1,440 degrees, and outputs the limited multiple rotation angle to the position FB unit 302. In this example, because the output shaft 101a of the synchronous motor 101 is configured in such a way as to have an angle ranging from −1,440 degrees to 1,440 degrees while the output shaft 103a of the linear motion translating mechanism 103 is reciprocating once, the multiple rotation angle is limited to the range from −1,440 degrees to 1,440 degrees.

Further, the multiple rotation processing unit 301 determines the rotating speed of the rotor of the synchronous motor 101 from the difference between the previous value and the current value of the single rotation angle sampled every 5 milliseconds, and outputs the rotating speed to the phase difference FB unit 305. At this time, the multiple rotation processing unit 301 can calculate the rotating speed that is continuous even though a discontinuity occurs for each rotation, by adding one of the multiple rotation correction values to the previous value of the single rotation angle.

Further, the multiple rotation processing unit 301 performs a filtering process on the single rotation angle x by using an equation (1), to smooth the single rotation angle and also correct the output value to an angle of one rotation or less when the output shaft 101a of the synchronous motor 101 makes one rotation, thereby determining a single rotation angle y after filtering process. In the equation (1), Kf is a filter coefficient, and Dy is the single rotation angle after previous filtering process. The multiple rotation processing unit 301 makes a one-rotation correction to Dy.

$$y=(1-Kf)\cdot x+Kf\cdot Dy \quad (1)$$

As a result, a continuous filtering process can be performed on the single rotation angle that changes suddenly when the rotor passes the position of 0 degrees. Further, the influence of the noise 201 on the output signal of the sensor 110 can be suppressed. The multiple rotation processing unit 301 outputs the single rotation angle after filtering process, as an after-filtering single rotation angle, to the phase difference FB unit 305.

The position FB unit 302 controls the amplitude a of a voltage vector applied to the synchronous motor 101 by performing feedback control in such a way that the multiple rotation angle outputted from the multiple rotation processing unit 301 is a target position 303, to control the position of the output shaft 101a of the synchronous motor 101. The position FB unit 302 outputs the amplitude a of the voltage vector to the three phase oscillating unit 309. The target position 303 of the output shaft 101a of the synchronous motor 101 is determined by, for example, a higher order controller such as an engine control unit, and is inputted to the control device 3. When a target position of the output shaft 103a of the linear motion translating mechanism 103, or the like is inputted from the higher order controller, the position FB unit 302 may convert the target position into the target position 303 of the output shaft 101a of the synchronous motor 101.

Instead of performing only the feedback control, the position FB unit 302 may perform a combination of feedback control and feedforward control. For example, the position FB unit 302 performs control to cause the multiple rotation angle to converge to the target position 303 by performing both feedback using a predictive proportional integral (IP) of the multiple rotation angle outputted from the multiple rotation processing unit 301, and feedforward of the target position 303.

Further, the position FB unit 302 may limit the amplitude a of the voltage vector controlled through the feedback and the feedforward, to a maximum at which voltage saturation occurs, or less, and, after that, output the amplitude to the three phase oscillating unit 309.

The phase detecting unit 304 divides an electrical angle speed ω outputted from the phase difference FB unit 305 by the number of pole pairs of the synchronous motor 101, to determine a mechanical angle speed. The phase detecting unit 304 determines a mechanical angle from the mechanical angle speed, and adds 360 degrees to the mechanical angle when this mechanical angle is equal to or less than 0 degrees or subtracts 360 degrees from the mechanical angle when this mechanical angle is equal to or greater than 360 degrees, thereby limiting the mechanical angle to a range from 0 degrees to 360 degrees at all times. The phase detecting unit 304 adds the mechanical angle and the phase (electrical angle) of the previous voltage vector, to determine the phase of a new voltage vector, and outputs the phase to the phase difference FB unit 305.

An initial phase 308 is the d-axis position of the rotor of the synchronous motor 101, and is the angle detected by the sensor 110 when the rotor of the synchronous motor 101 has an angle of 0 degrees. At the time of starting or manufacturing the control device 3, the control device 3 energizes the synchronous motor 101 to operate the actuator 1 and then acquires the output signal of the sensor 110, thereby setting up this initial phase 308.

Figure 2:
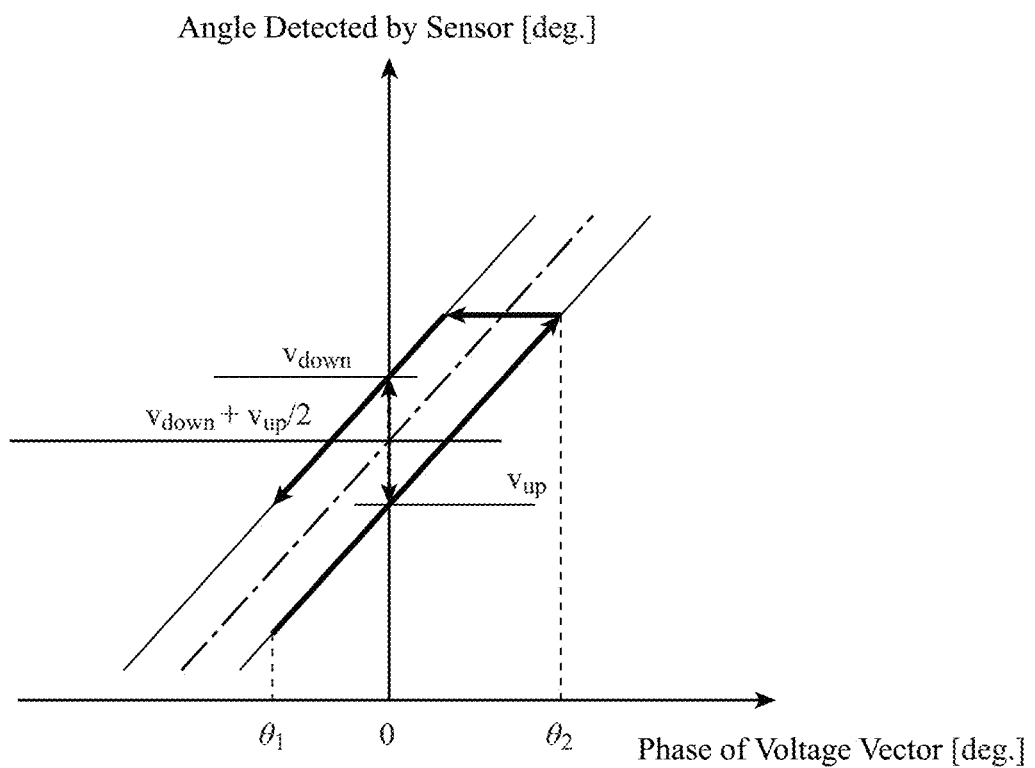
FIG. 2 is a graph showing an example of a method of setting up an initial phase in Embodiment 1.

Here, an example of a method of setting up the initial phase 308 is shown in FIG. 2. The vertical axis of the graph shown in FIG. 2 shows the angle detected by the sensor 110, and the horizontal axis shows the phase of the voltage vector. When $\theta_1<0$ and $\theta_2>0$ are provided as the phase of the voltage vector, the control device 3 sweeps the phase of the voltage vector applied to the synchronous motor 101 from $\theta_1$ to $\theta_2$. At this time, the rotor of the synchronous motor 101 rotates because of the energization, and thus the angle detected by the sensor 110 also varies. After sweeping the phase to $\theta_2$, the control device 3 reverses the sweeping direction and sweeps the phase to $\theta_1$. As a result of this, the relation between the phase of the voltage vector and the angle detected by the sensor 110 is measured. The angle detected by the sensor 110 when the phase becomes 0 degrees is estimated to be "$(v_{up}+v_{down})/2$", where the angle detected by the sensor 110 when the phase becomes 0 degrees in the case of sweeping the phase from $\theta_1$ to $\theta_2$ is denoted by $v_{up}$, and the angle detected by the sensor 110 when the phase becomes 0 degrees in the case of sweeping the phase from $\theta_2$ to $\theta_1$ is denoted by $v_{down}$. This estimated angle is set in the control device 3 as the initial phase 308.

The phase difference FB unit 305 adds the initial phase 308 to the after-filtering single rotation angle outputted from the multiple rotation processing unit 301, to determine the mechanical angle of the rotor. As a result of this, the mechanical angle of the rotor matches with the d-axis that is the magnetic flux direction of the rotor. Thus, the three phase oscillating unit 309 mentioned later can cause the synchronous motor 101 to be driven efficiently, by simply causing the energization to be performed in a direction of an electrical angle of +90 degrees with respect to the d-axis position when the rotor is to be driven in the positive direction, and causing the energization to be performed in a direction of an electrical angle of −90 degrees with respect to the d-axis position when the rotor is to be driven in the negative direction.

The phase difference FB unit 305 calculates the electrical angle speed ω that causes the phase difference between the phase of the voltage vector outputted from the phase detecting unit 304 and the above-mentioned mechanical angle of the rotor to be a target phase difference 306. An integral control unit 307 then integrates the electrical angle speed ω, to determine the phase θ of a voltage vector, and outputs this phase to the three phase oscillating unit 309. The phase difference FB unit 305 controls the rotating speed of the rotor of the synchronous motor 101 by controlling the phase θ of the voltage vector to be applied to the synchronous motor 101.

The phase difference FB unit 305 performs feedback control using the integral control unit 307, for example. The integration gain used in the integral control unit 307 at that time is a coefficient with which to control the electrical angle speed ω in such a way as to increase the angular frequency when the phase of the voltage vector lags behind the mechanical angle, and decrease the angular frequency when the phase of the voltage vector leads the mechanical angle. Because the phase difference is fed back by means of the integral control, the output signal of the sensor 110 is averaged and the electrical angle speed ω is stabilized.

Further, the phase difference FB unit 305 may limit the electrical angle speed ω in such a way that the electrical angle speed falls within a speed range dependent on the rotating speed outputted from the multiple rotation processing unit 301. For example, the phase difference FB unit 305 sets up an upper limit and a lower limit on the speed range depending on the newest rotating speed outputted from the multiple rotation processing unit 301. In this case, the integral control unit 307 integrates the limited electrical angle speed ω.

The target phase difference 306 may be a fixed value, or may be a changeable value corresponding to the rotating speed.

When a fixed value is used as the target phase difference 306, the phase difference FB unit 305 divides the electrical angle of 90 degrees by the number of pole pairs of the synchronous motor 101, to determine the mechanical angle, and uses this mechanical angle as the target phase difference 306.

When a changeable value is used as the target phase difference 306, the phase difference FB unit 305 holds a look-up table showing a relation between the above-mentioned limited electrical angle speed ω and the phase difference in advance, selects the phase difference corresponding to the above-mentioned limited electrical angle speed ω from the look-up table, and uses the selected phase difference as the target phase difference 306. Further, the phase difference FB unit 305 may determine the target phase difference 306 on the basis of the magnitudes of phase currents, phase voltages, or the likes.

FIGS. 3A to 3D are graphs showing the waveforms of values related to the control by the phase difference FB unit 305. FIGS. 3A to 3D show simulation results. The horizontal axis of each graph shows a time.

Figure 3A:
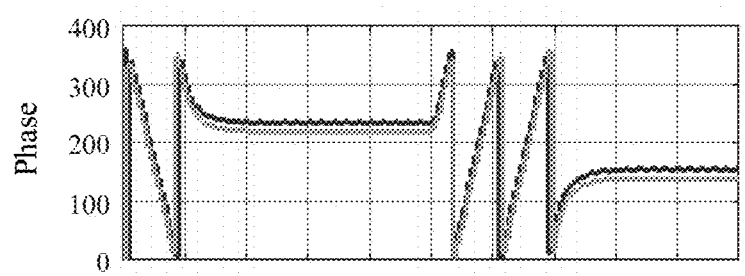
FIGS. 3A to 3D are graphs showing the waveforms of values related to control by a phase difference FB unit of Embodiment 1.
Figure 3B:
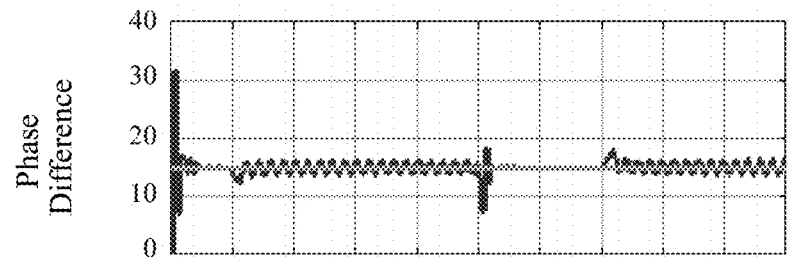
Figure 3C:
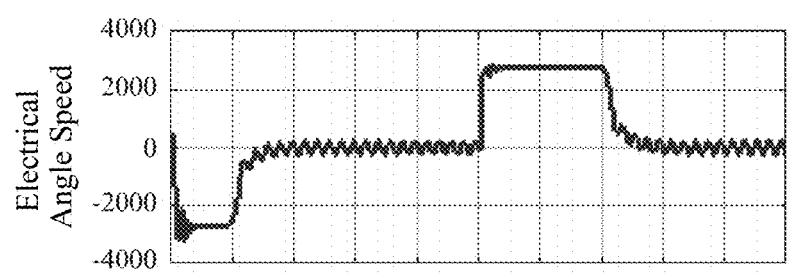
Figure 3D:
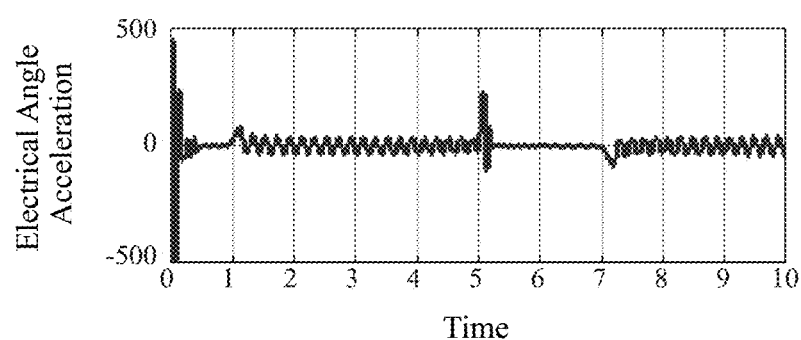

FIG. 3A is a graph of the phase (shown by black) of the voltage vector inputted from the phase detecting unit 304 to the phase difference FB unit 305, and the mechanical angle (shown by gray) of the rotor that the phase difference FB unit 305 determines. FIG. 3B is a graph of the phase difference (shown by black) between the phase of the voltage vector and the mechanical angle of the rotor, the phase difference being determined by the phase difference FB unit 305, and the target phase difference 306 (shown by gray) that is a fixed value. FIG. 3C is a graph of the electrical angle speed ω controlled by the phase difference FB unit 305. FIG. 3D is a graph of electrical angle acceleration. The electrical angle acceleration is an integral term calculated in order for the integral control unit 307 to control the electrical angle speed ω.

The three phase oscillating unit 309 generates U-, V-, and W-phase signals each having the amplitude a outputted from the position FB unit 302 and the phase θ outputted from the phase difference FB unit 305, by using a waveform stored in a waveform storage unit 310, and outputs the U-, V-, and W-phase signals to the driving circuit 311. In the control device 3, while components other than the three phase oscillating unit 309 each operate at sampling intervals of 5 milliseconds, this three phase oscillating unit 309 operates at sampling intervals shorter than 5 milliseconds (for example, at sampling intervals of 0.2 milliseconds). For example, the three phase oscillating unit 309 adds the angular speed with a sampling period of 0.2 milliseconds to the phase θ with a sampling period of 0.5 milliseconds, the phase θ being outputted from the phase difference FB unit 305, to determine the phase θ with a sampling period of 0.2 milliseconds.

Figure 4:
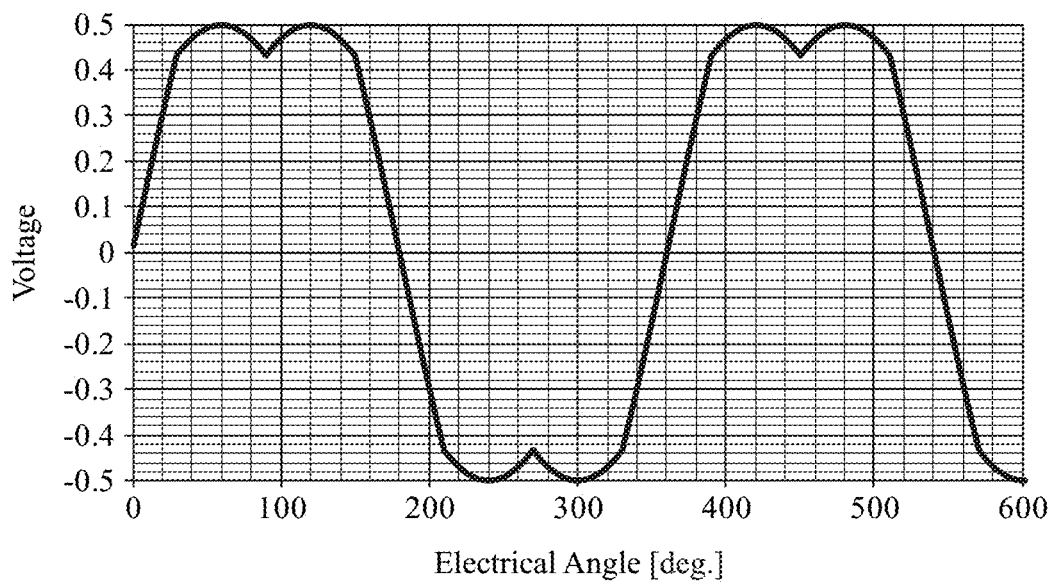
FIG. 4 is a graph showing an example of a waveform that a waveform storage unit of Embodiment 1 stores.

The waveform storage unit 310 stores a voltage waveform. FIG. 4 is a graph showing an example of the waveform that the waveform storage unit 310 of Embodiment 1 stores. This voltage waveform is a vector having 601 elements having electrical angles increasing in 1-degree steps from zero degrees to 600 degrees.

By referring to the vector that the waveform storage unit 310 stores, the three phase oscillating unit 309 extracts, as a U element, a vector element value having an electrical angle corresponding to the phase θ with a sampling period of 0.2 milliseconds, extracts, as a V element, a vector element value having an electrical angle that is the result of adding 240 degrees to the above-mentioned phase 74, and extracts, as a W element, a vector element value having an electrical angle that is the result of adding 120 degrees to the above-mentioned phase θ. Next, the three phase oscillating unit 309 multiplies each of the U, V, and W elements by the amplitude a outputted from the position FB unit 302 and adds 0.5 to each of the multiplication results, thereby converting the voltage values into duty values to determine U-, V-, and W-phase duty values. The three phase oscillating unit 309 then generates U-, V-, and W-phase pulse signals by using the U-, V-, and W-phase duty values, and outputs the U-, V-, and W-phase pulse signals to the driving circuit 311.

In general vector control, because conversion from the d-q axes to the UVW axes, i.e., so-called two-phase to three-phase conversion is performed in calculations of duty values, complicated calculations are needed. In contrast with this, the three phase oscillating unit 309 does not have to perform two-phase to three-phase conversion, and thus can determine duty values in a short time more simply.

The driving circuit 311 applies voltages to a U-phase winding, a V-phase winding, and a W-phase winding of the synchronous motor 101 in response to the U-, V-, and W-phase pulse signals outputted from the three phase oscillating unit 309, to drive the rotor of the synchronous motor 101. This driving circuit 311 has, for example, a three phase inverter in which six switches are connected in a three phase bridge arrangement.

By performing the energization of the synchronous motor 101 in response to the pulse signals generated from the voltage waveform shown in FIG. 4, the driving circuit 311 can perform the energization in a direction of an electrical angle of +90 degrees with respect to the d-axis position when driving the rotor in the positive direction, and perform the energization in a direction of an electrical angle of −90 degrees with respect to the d-axis position when driving the rotor in the negative direction. Thus, the driving circuit 311 can drive the synchronous motor 101 efficiently.

Figure 5:
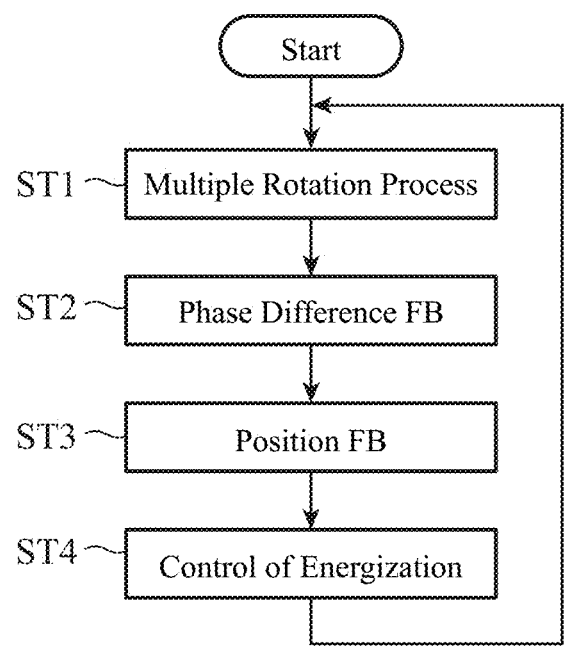
FIG. 5 is a flow chart showing an example of the operation of the control device according to Embodiment 1 for the actuator.

FIG. 5 is a flow chart showing an example of the operation of the control device 3 according to Embodiment 1 for the actuator 1.

In step ST1, the multiple rotation processing unit 301 converts an angle of one rotation or more that is detected by the sensor 110 into a multiple rotation angle.

In step ST2, the phase difference FB unit 305 performs the feedback control in such a way that the phase difference between the electrical angle and the mechanical angle of the synchronous motor 101 is the target phase difference 306.

In step ST3, the position FB unit 302 performs the feedback control in such a way that the multiple rotation angle after conversion by the multiple rotation processing unit 301 is the target position 303.

In step ST4, the three phase oscillating unit 309 controls the energization of the synchronous motor 101 by generating pulse signals on the basis of both a result of the control by the phase difference FB unit 305 and a result of the control by the position FB unit 302, and outputting the pulse signals to the driving circuit 311.

As mentioned above, the control device 3 according to Embodiment 1 for the actuator 1 includes: the sensor 110 that detects the angle of the output shaft 101a of the synchronous motor 101; the multiple rotation processing unit 301 that converts the angle of one rotation or more that is detected by the sensor 110 into a multiple rotation angle; the phase difference FB unit 305 that performs feedback control in such a way that the phase difference between the electrical angle and the mechanical angle of the synchronous motor 101 is the target phase difference 306; the position FB unit 302 that performs feedback control in such a way that the multiple rotation angle after conversion by the multiple rotation processing unit 301 is the target position 303; and the three phase oscillating unit 309 that controls the energization of the synchronous motor 101 on the basis of both a result of the control by the phase difference FB unit 305 and a result of the control by the position FB unit 302. In this way, the phase difference FB unit 305 controls the speed of the rotor of the synchronous motor 101, and the position FB unit 302 controls the position of the output shaft 103a of the actuator 1. Thus, the operation of the synchronous motor 101 can be stabilized using the sensor 110 that detects the angle of the output shaft 101a of the actuator 1.

Further, the phase difference FB unit 305 of Embodiment 1 uses "$(v_{up}+v_{down})/2$" which is the average of the angles detected by the sensor 110 when the rotor of the synchronous motor 101 is rotated both in the positive direction and in the negative direction, as the d-axis position of the rotor, i.e., the initial phase 308. As a result, the magnetic pole position of the rotor with respect to the output signal of the sensor 110 can be detected.

Further, the three phase oscillating unit 309 of Embodiment 1 causes the energization to be performed in a direction of +90 degrees with respect to the d-axis position when the three phase oscillating unit 309 causes the rotor to be rotated in the positive direction, and causes the energization to be performed in a direction of −90 degrees with respect to the d-axis position when the three phase oscillating unit 309 causes the rotor to be rotated in the negative direction. As a result, the synchronous motor 101 can be driven efficiently.

Further, the phase difference FB unit 305 of Embodiment 1 increases the angular frequency when the electrical angle lags, and decreases the angular frequency when the electrical angle leads. Because the phase difference FB unit 305 controls the angular frequency, the control logic of the phase difference FB unit 305 can be simplified.

Further, the position FB unit 302 of Embodiment 1 controls the amplitude a of the voltage vector. As a result, the interference between the control by the position FB unit 302 and the control by the phase difference FB unit 305 that controls the phase of the voltage vector can be prevented.

Further, the multiple rotation processing unit 301 of Embodiment 1 performs the filtering process of, using the equation (1), smoothing the angle detected by the sensor 110 and also correcting the output value to an angle of one rotation or less when the output shaft 101a of the synchronous motor 101 makes one rotation or more. The phase difference FB unit 305 converts the after-filtering single rotation angle into a mechanical angle. As a result, because the multiple rotation processing unit 301 does not have to perform a multiple rotation process and should just perform the filtering process for the control by the phase difference FB unit 305, the logic of the multiple rotation processing unit 301 can be simplified. Further, the output signal of the sensor 110, the output signal being degraded due to invasion of noise 201 into the sensor harness 2, can be smoothed.

Further, the phase difference FB unit 305 of Embodiment 1 limits the electrical angle speed ω to within the speed range that varies depending on the rotating speed of the rotor of the synchronous motor 101. As a result, when noise 201 invades into the sensor harness 2, and thereby the output signal of the sensor 110 degrades, the electrical angle speed a can be prevented from having an erroneous value in response to the noise 201.

Further, in Embodiment 1, the sampling period (e.g., 0.2 milliseconds) of the three phase oscillating unit 309 is shorter than that (e.g., 5 milliseconds) of each of the phase difference FB unit 305 and the position FB unit 302. As a result, the processing loads on the phase difference FB unit 305 and the position FB unit 302 can be reduced. Further, the signal waveform that the three phase oscillating unit 309 generates becomes smooth, and thus the rotor of the synchronous motor 101 rotates smoothly.

The sensor 110 of Embodiment 1 detects the angle of the output shaft 101a of the synchronous motor 101, as the angle of the output shaft of the actuator 1, but is not limited to this. The sensor 110 may detect the angle of the input shaft or the output shaft of the decelerating mechanism 102.

Further, the sensor 110 may detect the stroke position of the output shaft 103a of the linear motion translating mechanism 103, and convert the detected stroke position into the angle of the output shaft 101a of the synchronous motor 101, or the like. The output signal of the sensor that detects the stroke position also has accuracy and resolution worse than those of an output signal of a sensor that detects the magnetic pole position of the rotor of the synchronous motor, like an output signal of a sensor, as described in Patent Literature 1, that detects the angular position of the output shaft of a decelerating mechanism. Also in such a case, the operation of the synchronous motor 101 can be stabilized by the control device 3 according to Embodiment 1.

Embodiment 2

In Embodiment 1, the example in which the energization of the synchronous motor 101 is controlled using the voltage vector is explained. In Embodiment 2, an example in which the energization of a synchronous motor 101 is controlled using a current vector will be explained.

Figure 6:
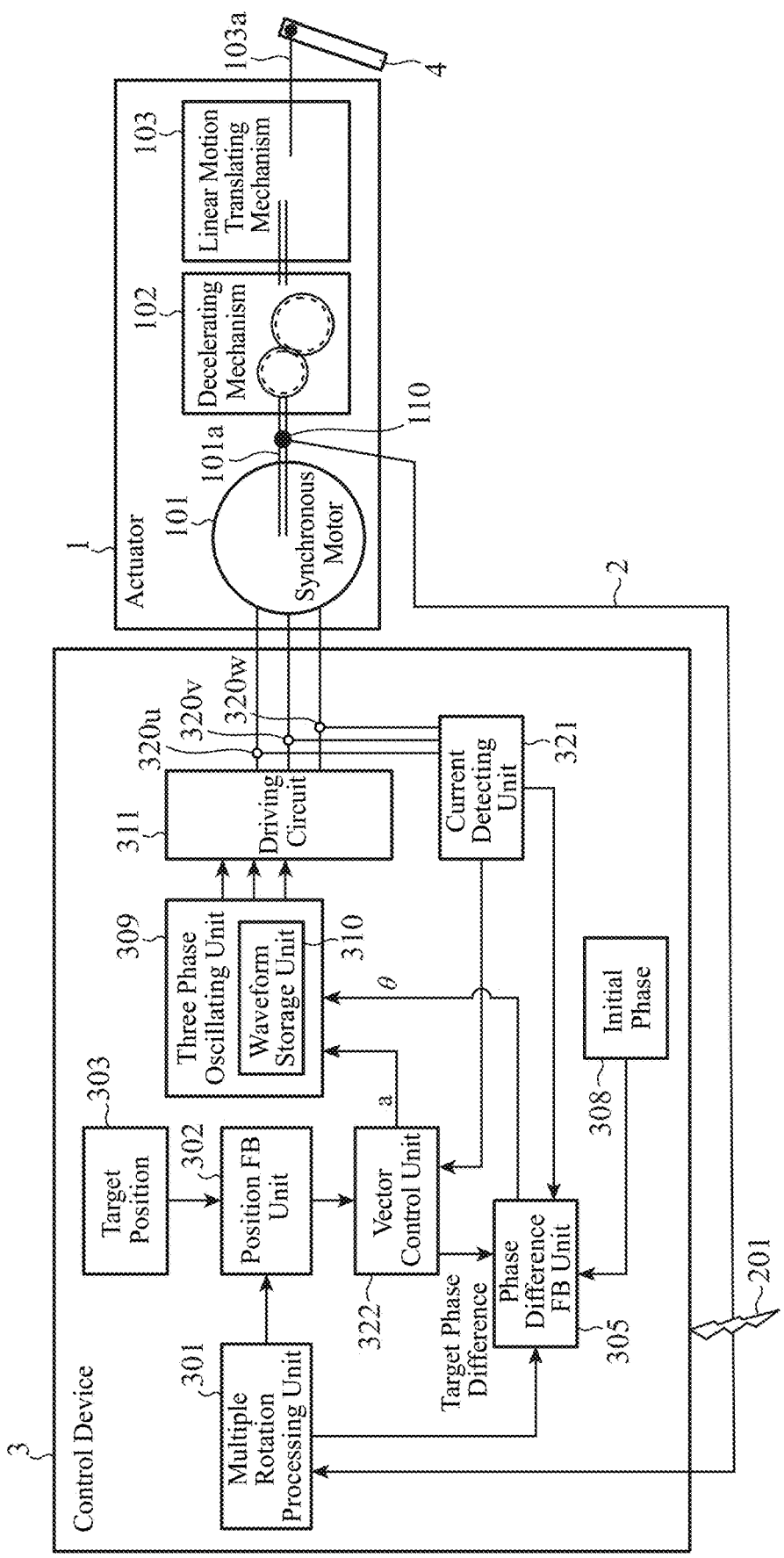
FIG. 6 is a block diagram showing an example of the configuration of a control device according to Embodiment 2 for an actuator.

FIG. 6 is a block diagram showing an example of the configuration of a control device 3 according to Embodiment 2 for an actuator 1. The control device 3 according to Embodiment 2 has a configuration in which current detecting sensors 320u, 320v, and 320w, a current detecting unit 321, and a vector control unit 322 are added to the control device 3 of Embodiment 1 shown in FIG. 1, and the phase detecting unit 304 is deleted from the control device 3 of Embodiment 1. In FIG. 6, components which are the same as or corresponding to those shown in FIG. 1 are denoted by the same reference signs, and an explanation of the components will be omitted hereafter.

The current detecting unit 321 detects U, V, and W phase currents by using output signals of the current detecting sensors 320u, 320v, and 320w. The current detecting unit 321 outputs the phases of the detected phase currents to a phase difference FB unit 305, and outputs the amplitudes of the detected phase currents to the vector control unit 322.

The vector control unit 322 calculates the amplitude of a current vector by using the amplitudes of the U, V, and W phase currents outputted from the current detecting unit 321. Then, the vector control unit 322 performs current value feedback control in such a way that the calculated amplitude of the current vector is the amplitude of a current vector outputted from a position FB unit 302, calculates the amplitude a of a current vector providing a positional relationship in which the d-axis and the q-axis are displaced 90 degrees, and outputs the amplitude a to a three phase oscillating unit 309. Further, the vector control unit 322 calculates a target phase difference 306 providing the positional relationship in which the d-axis and the q-axis are displaced 90 degrees, and outputs the target phase difference to the phase difference FB unit 305.

The phase difference FB unit 305 performs feedback control in such a way that the phase difference between the phase (electrical angle) of the current vector outputted from the current detecting unit 321 and the mechanical angle of a rotor determined from an after-filtering single rotation angle outputted from a multiple rotation processing unit 301 is the target phase difference 306 outputted from the vector control unit 322, to control an electrical angle speed ω. Then, an integral control unit 307 integrates the electrical angle speed w, to determine the phase θ of a current vector, and outputs the phase θ to the three phase oscillating unit 309. The three phase oscillating unit 309 assumes that there is a one-to-one correspondence between current values and duty values, and determines U-, V-, and W-phase duty values in the energization of the synchronous motor 101, by using both the amplitude a of the current vector outputted from the vector control unit 322, and the phase θ of the current vector outputted from the phase difference FB unit 305. The vector control unit 322 can check the relation between the current values and the duty values in the current value feedback, on the basis of the phase currents that the current detecting unit 321 detects.

In Embodiment 2, $\theta_1$ and $\theta_2$ shown in FIG. 2 shall be replaced by phases of the current vector. An initial phase 308 is "$(v_{up}+v_{down})/2$" which is the average of the angle $v_{up}$ detected by a sensor 110 when the phase becomes 0 degrees in the case of sweeping the phase from $\theta_1$ to $\theta_2$, and the angle $v_{down}$ detected by the sensor 110 when the phase becomes 0 degrees in the case of sweeping the phase from $\theta_2$ to $\theta_1$.

As mentioned above, the configuration in which the energization of the synchronous motor 101 is controlled using the current vector and which is shown by the control device 3 according to Embodiment 2 for the actuator 1 also has the same advantage as the configuration in which the energization of the synchronous motor 101 is controlled using the voltage vector and which is shown by the control device 3 according to Embodiment 1 for the actuator 1.

Finally, the hardware configuration of the control device 3 according to each of Embodiments 1 and 2 will be explained.

Figure 7A:
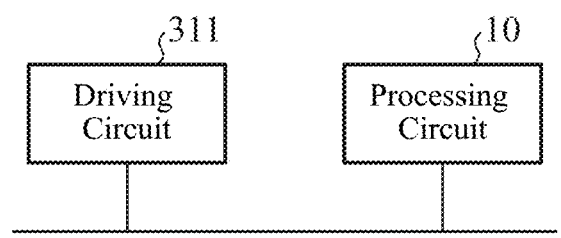
FIGS. 7A and 7B are diagrams showing examples of the hardware configuration of the control device according to each embodiment for the actuator.
Figure 7B:
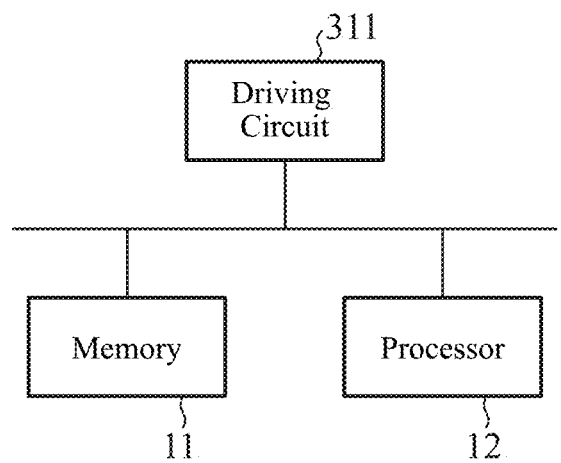

FIGS. 7A and 7B are hardware block diagrams showing examples of the hardware configuration of the control device 3 according to each of the embodiments. The driving circuit 311 in the control device 3 is a three phase inverter. Each of the functions of the multiple rotation processing unit 301, the position FB unit 302, the phase detecting unit 304, the phase difference FB unit 305, the three phase oscillating unit 309, the current detecting unit 321, and the vector control unit 322 in the control device 3 is implemented by a processing circuit. More specifically, the control device 3 includes a processing circuit for implementing each of the above-mentioned functions. The processing circuit may be a processing circuit 10 as hardware for exclusive use, or may be a processor 12 that executes a program stored in a memory 11.

As shown in FIG. 7A, in the case in which the processing circuit is hardware for exclusive use, the processing circuit 10 is, for example, a single circuit, a composite circuit, a programmable processor, a parallel programmable processor, an application specific integrated circuit (ASIC), a field programmable gate array (FPGA), or a combination thereof. The functions of the multiple rotation processing unit 301, the position FB unit 302, the phase detecting unit 304, the phase difference FB unit 305, the three phase oscillating unit 309, the current detecting unit 321, and the vector control unit 322 may be implemented by multiple processing circuits 10, and the functions of the units may be implemented collectively by a single processing circuit 10.

As shown in FIG. 7B, in the case in which the processing circuit is the processor 12, each of the functions of the multiple rotation processing unit 301, the position FB unit 302, the phase detecting unit 304, the phase difference FB unit 305, the three phase oscillating unit 309, the current detecting unit 321, and the vector control unit 322 is implemented by software, firmware, or a combination of software and firmware. The software or the firmware is described as a program and the program is stored in the memory 11. The processor 12 implements the function of each of the units by reading and executing the program stored in the memory 11. More specifically, the control device 3 includes the memory 11 for storing a program by which the steps shown in the flow chart of FIG. 5 are performed as a result when the program is executed by the processor 12. Further, it can be said that this program causes a computer to perform procedures or methods that the multiple rotation processing unit 301, the position FB unit 302, the phase detecting unit 304, the phase difference FB unit 305, the three phase oscillating unit 309, the current detecting unit 321, and the vector control unit 322 use.

Here, the processor 12 is a central processing unit (CPU), a processing device, an arithmetic device, a microprocessor, a microcomputer, or the like.

The memory 11 may be a non-volatile or volatile semiconductor memory such as a random access memory (RAM), a read only memory (ROM), an erasable programmable ROM (EPROM), or a flash memory, may be a magnetic disc such as a hard disc or a flexible disc, or may be an optical disc such as a compact disc (CD) or a digital versatile disc (DVD).

The waveform storage unit 310 is included in the memory 11.

A part of the functions of the multiple rotation processing unit 301, the position FB unit 302, the phase detecting unit 304, the phase difference FB unit 305, the three phase oscillating unit 309, the current detecting unit 321, and the vector control unit 322 may be implemented by hardware for exclusive use, and another part of the functions may be implemented by software or firmware. In this way, the processing circuit in the control device 3 can implement each of the above-mentioned functions by using hardware, software, firmware, or a combination of hardware, software, and firmware.

It is to be understood that any combination of the embodiments can be made, various changes can be made in any component according to any one of the embodiments, and any component according to any one of the embodiments can be omitted within the scope of the present disclosure.

INDUSTRIAL APPLICABILITY

Because the control device according to the present disclosure for an actuator stabilizes the operation of the synchronous motor even though noise invades into the sensor harness, the control device is suitable for use as a control device for an actuator having a long sensor harness, such as a vehicle-mounted actuator.

REFERENCE SIGNS LIST 1 actuator, 2 sensor harness, 3 control device, 4 lever, 10 processing circuit, 11 memory, 12 processor, 101 synchronous motor, 101a, 103a output shaft, 102 decelerating mechanism, 103 linear motion translating mechanism, 110 sensor, 201 noise, 301 multiple rotation processing unit, 302 position FB unit, 303 target position, 304 phase detecting unit, 305 phase difference FB unit, 306 target phase difference, 307 integral control unit, 308 initial phase, 309 three phase oscillating unit, 310 waveform storage unit, 311 driving circuit, 320u, 320v, 320w current detecting sensor, 321 current detecting unit, 322 vector control unit, a amplitude, θ phase, and ω electrical angle speed.

The invention claimed is:

1. A control device for an actuator that uses a synchronous motor as a power source, the device comprising:

a sensor to detect an angle of an output shaft of the actuator; and processing circuitry to convert the angle of one rotation or more that is detected by the sensor into a multiple rotation angle, the angle of one rotation or more being indicated by a value equal to or greater than 0 and equal to or less than 360, the multiple rotation angle being acquired by adding 360 degrees to the angle of one rotation or more when the output shaft has made one rotation in a positive direction and by subtracting 360 degrees from the angle of one rotation or more when the output shaft has made one rotation in a negative direction opposite to the positive direction;

to perform feedback control in such a way that a phase difference between an electrical angle and a mechanical angle of the synchronous motor is a target phase difference;

to perform feedback control in such a way that the multiple rotation angle after conversion is a target position of the actuator; and to control energization of the synchronous motor on a basis of both a result of the feedback control of the phase difference and a result of the feedback control of the multiple rotation angle after conversion.

2. The control device for the actuator according to claim 1, wherein the processing circuitry uses, as a d-axis position of a rotor of the synchronous motor, an average of angles detected by the sensor when the rotor is rotated both in the positive direction and in the negative direction.

3. The control device for the actuator according to claim 2, wherein the processing circuitry causes energization to be performed in a direction of +90 degrees with respect to the d-axis position when the processing circuitry causes the rotor to be rotated in the positive direction, and causes energization to be performed in a direction of −90 degrees with respect to the d-axis position when the processing circuitry causes the rotor to be rotated in the negative direction.

4. The control device for the actuator according to claim 1, wherein the processing circuitry controls an electrical angle speed in such a way as to increase an angular frequency when the electrical angle lags, and decrease the angular frequency when the electrical angle leads.

5. The control device for the actuator according to claim 1, wherein the processing circuitry controls an amplitude of either a voltage vector or a current vector.

6. The control device for the actuator according to claim 1, wherein the processing circuitry performs a filtering process of smoothing the angle detected by the sensor, and also correcting an output value to an angle of one rotation or less when the output shaft of the actuator makes one rotation or more, and the processing circuitry converts an angle obtained by the filtering process into the mechanical angle.

7. The control device for the actuator according to claim 4, wherein the processing circuitry limits the electrical angle speed to within a speed range that varies depending on a rotating speed of a rotor of the synchronous motor.

8. The control device for the actuator according to claim 1, wherein a sampling period in the control of the energization is shorter than that in each of the feedback control of the phase difference and the feedback control of the multiple rotation angle after conversion.

9. A control method for an actuator that uses a synchronous motor as a power source, the method comprising:
converting an angle of one rotation or more of an output shaft of the actuator, the angle being detected by a sensor, into a multiple rotation angle, the angle of one rotation or more being indicated by a value equal to or greater than 0 and equal to or less than 360, the multiple rotation angle being acquired by adding 360 degrees to the angle of one rotation or more when the output shaft has made one rotation in a positive direction and by subtracting 360 degrees from the angle of one rotation or more when the output shaft has made one rotation in a negative direction opposite to the positive direction;
performing feedback control in such a way that a phase difference between an electrical angle and a mechanical angle of the synchronous motor is a target phase difference;
performing feedback control in such a way that the multiple rotation angle after conversion is a target position of the actuator; and
controlling energization of the synchronous motor on a basis of both a result of the feedback control of the phase difference and a result of the feedback control of the multiple rotation angle after conversion.

* * * * *